United States Patent
Kikuchi et al.

(10) Patent No.: US 7,462,219 B2
(45) Date of Patent: *Dec. 9, 2008

(54) PRODUCTION METHOD OF METAL IRON

(75) Inventors: Shoichi Kikuchi, Kobe (JP); Koji Tokuda, Kobe (JP); Isao Kobayashi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 111 days.

This patent is subject to a terminal disclaimer.

(21) Appl. No.: 10/486,498

(22) PCT Filed: Jun. 17, 2002

(86) PCT No.: PCT/JP02/05997

§ 371 (c)(1),
(2), (4) Date: Feb. 11, 2004

(87) PCT Pub. No.: WO03/020988

PCT Pub. Date: Mar. 13, 2003

(65) Prior Publication Data

US 2004/0211295 A1 Oct. 28, 2004

(30) Foreign Application Priority Data

Aug. 31, 2001 (JP) .............................. 2001-263944

(51) Int. Cl.
*C21B 13/08* (2006.01)
(52) U.S. Cl. ....................................................... 75/484
(58) Field of Classification Search ..................... 75/484
See application file for complete search history.

(56) References Cited

U.S. PATENT DOCUMENTS 5,989,019 A * 11/1999 Nishimura et al. .......... 432/138

(Continued)

FOREIGN PATENT DOCUMENTS

CA 2374700 10/2006

(Continued)

OTHER PUBLICATIONS

Machine translation of JP 11-172312.*

(Continued)

*Primary Examiner*—Roy King
*Assistant Examiner*—Tima M McGuthry-Banks
(74) *Attorney, Agent, or Firm*—Oblon, Spivak, McClelland, Maier & Neustadt, P.C.

(57) ABSTRACT

A method producing metallic iron by reducing raw materials including an iron-oxide containing material and a carbonaceous reducing agent under heating, which can minimize re-oxidization of the metallic iron and can efficiently produce metallic iron having a high metallization ratio and high iron purity at high yield. The method produces metallic iron, by heating raw materials including a carbonaceous reducing agent and an iron-oxide containing material in a reduction melting furnace of the moving hearth type, and reducing and melting iron oxides in the raw materials. The reduction melting furnace is partitioned into at least three zones in a hearth moving direction, at least one partitioned zone upstream in the hearth moving direction is a solid-state reducing zone, at least one downstream partitioned zone is a carburization melting zone, and a reduction aging zone is between the solid-state reducing zone and the carburization melting zone.

6 Claims, 4 Drawing Sheets

U.S. PATENT DOCUMENTS

| | | | |
|---|---|---|---|
| 6,036,744 A | 3/2000 | Negami et al. | |
| 6,630,010 B2 * | 10/2003 | Ito et al. | 75/484 |
| 2004/0083853 A1 | 5/2004 | Sugitatsu et al. | |

FOREIGN PATENT DOCUMENTS

| | | | |
|---|---|---|---|
| CN | 1383453 A | | 12/2002 |
| EP | 0 969 105 A1 | | 1/2000 |
| EP | 1 050 589 A1 | * | 11/2000 |
| JP | 11-172312 | | 6/1999 |
| JP | 2001-20005 | | 1/2001 |
| JP | 2001-181719 | | 7/2001 |
| WO | WO 00/29628 | | 5/2000 |
| WO | WO 01/73137 | * | 10/2001 |
| WO | WO 01/73137 A3 | | 10/2001 |

OTHER PUBLICATIONS

Machine translation of JP 2001-181719.*

* cited by examiner

PRODUCTION METHOD OF METAL IRON

TECHNICAL FIELD

The present invention relates to a technique for obtaining metallic iron with heating reduction of iron oxides, such as iron ore, using a carbonaceous reducing agent, such as coke, and more particularly to a method capable of producing metallic iron of high purity at a high yield.

BACKGROUND ART

As a direct iron-making method for obtaining reduced iron through direct reduction of an iron-oxide containing material, such as iron ore and iron oxides, with a reducing gas, such as a carbonaceous material, there is conventionally known a shaft furnace process represented by the so-called Midrex process. According to that type of direct iron-making method, a reducing gas produced from natural gas, etc. is blown into a shaft furnace through a tuyere formed in a lower portion of the shaft furnace, and metallic iron is obtained by reducing iron oxides with the aid of reducing power of the blown reducing gas. Recently, attention has been focused on a process of producing reduced iron, in which a carbonaceous material, such as coal, is used as a reducing agent instead of natural gas. By way of example, the so-called SL/RN process has been already put into practice.

As another method, U.S. Pat. No. 3,443,931 discloses a process of mixing a carbonaceous material and powdery iron oxides in the form of agglomerates or pellets, and reducing the mixture under heating on a rotary hearth, thereby producing reduced iron.

Further, Japanese Unexamined Patent Application Publication No. 2000-144224 discloses a method of supplying an iron-oxide material containing a carbonaceous material onto a hearth of a rotary hearth furnace, and reducing the iron-oxide material under heating, thereby producing reduced iron. That disclosed method employs a rotary hearth-furnace having the interior, which is made up of a material supply zone (12), burner zones (14, 16), a reaction zone (17), and a discharge zone (18). By employing such a rotary hearth furnace, iron oxides are reduced on the hearth surface kept at high temperature and slag components are separated from produced iron, whereby high-purity iron with a carbon concentration of 1 to 5 mass % can be produced. According to that disclosed method, a highly reducing gas atmosphere is maintained in the vicinity of raw materials during the progress of reduction with the presence of a reducing gas (comprising primarily carbon monoxide) that is generated as a result of the reaction between the carbonaceous material and the iron oxides which are both contained in the raw materials. In the last period of reduction corresponding to the reaction zone (17), however, the amount of the generated reducing gas is reduced and the concentration of an oxidizing gas, such as moisture and carbon dioxide generated as exhaust gas upon burner combustion for heating the raw materials, is relatively increased. This leads to a risk that the reduced iron produced as a product is re-oxidized. Particularly, since there is a variation in the progress of reduction of the iron oxides in the last period of the reduction, reduced iron having progressed more sufficiently in reduction tends to be more easily re-oxidized. In some cases, therefore, that reduced iron is not sufficiently carburized and melted, and then discharged while it remains in a not-yet molten state.

In view of the above-mentioned problems in the related art, an object of the present invention is to establish a technique which is applied to a process of producing metallic iron by reducing raw materials including an iron-oxide containing material and a carbonaceous reducing agent under heating, and which can minimize re-oxidization of the metallic iron, i.e., a problem occurred in the last period of solid-state reduction, and can efficiently produce metallic iron having a high metallization ratio and high iron purity at a high yield.

Another object of the present invention is to establish a technique which can minimize the FeO concentration in molten slag in the last period of solid-state reduction, can suppress erosion of a hearth refractory caused by molten FeO to prolong the life of the hearth refractory, and is suitably practiced for long-term continuous operation while improving maintainability of a plant.

DISCLOSURE OF THE INVENTION

The present invention having succeeded in overcoming the above-mentioned problems resides in a method for producing metallic iron, comprising the steps of heating raw materials including a carbonaceous reducing agent and an iron-oxide containing material in a reduction melting furnace of the moving hearth type, and reducing and melting iron oxides in the raw materials, wherein the reduction melting furnace is partitioned into at least three zones in a hearth moving direction, at least one of the partitioned zones on the upstream side in the hearth moving direction is a solid-state reducing zone, at least one of the partitioned zones on the downstream side in the hearth moving direction is a carburization melting zone, and a reduction aging zone is provided between the solid-state reducing zone and the carburization melting zone. When practicing the present invention, preferably, an atmosphere temperature and/or an atmosphere gas composition in the reduction aging zone are adjusted. It is also recommended that an atmosphere modifier be supplied to the reduction aging zone and/or the carburization melting zone. Further, preferably, the atmosphere modifier is supplied by utilizing a partition wall between the zones. When practicing the present invention, a partition wall between the zones is preferably provided with one or more openings for communication with the adjacent zone. Further, it is recommended that an atmosphere temperature in the reduction aging zone is adjusted to the range of 1200 to 1500° C.

BEST MODE FOR CARRYING OUT THE INVENTION

As a result of carrying out intensive studies to solve the above-mentioned problems occurred in the last period of reduction, i.e., studies on how to prevent re-oxidization of reduced iron and to prevent generation of molten FeO, the inventors have found that the above-mentioned objects can be achieved by providing, in a reduction melting furnace, an adjusting zone (reduction aging zone) to increase a reduction degree of reduced iron produced through a reducing step in the furnace. In particular, the inventors have accomplished the present invention based on the finding that superior effects can be obtained by properly controlling an atmosphere gas composition and an atmosphere temperature in the reduction aging zone.

More specifically, according to the present invention, when producing metallic iron through the steps of heating raw materials including a material containing an iron-oxide source (hereinafter referred to also as an iron-oxide containing material), such as iron ore and iron oxides or partly reduced materials thereof, and a carbonaceous reducing agent, such as coke and coal, in a reduction melting furnace of the moving hearth type, and then reducing and melting iron oxides in the raw materials, wherein the reduction melting furnace is partitioned into at least three zones in a hearth moving direction, at least one of the partitioned zones on the upstream side in the hearth moving direction is a solid-state reducing zone, at least one of the partitioned zones on the downstream side in the hearth moving direction is a carburization melting zone, and a reduction aging zone is provided between the solid-state reducing zone and the carburization melting zone. More details of the present invention will be described below with reference to embodiments and the drawings illustrating the embodiments.

While the following description is made of the case of employing, as raw materials, compacts of raw materials including an iron-oxide containing material and a carbonaceous reducing agent (hereinafter referred to as a "raw-material compacts"), the raw materials used in the present invention are not limited to the form of compacts, but may be in the form of powder. Also, the compact may have any of various shapes including the form of a pellet or a briquette.

Figure 1:
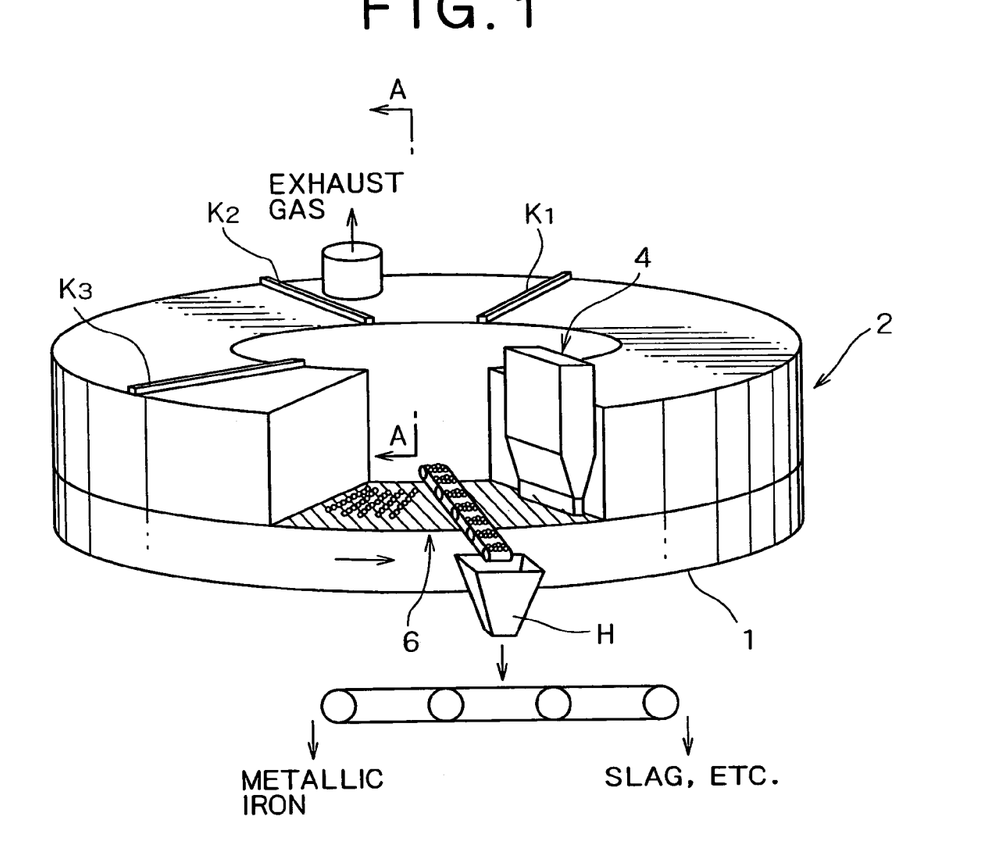
FIG. 1 is an explanatory view showing one example of a reduction melting apparatus used in the present invention.
Figure 2:
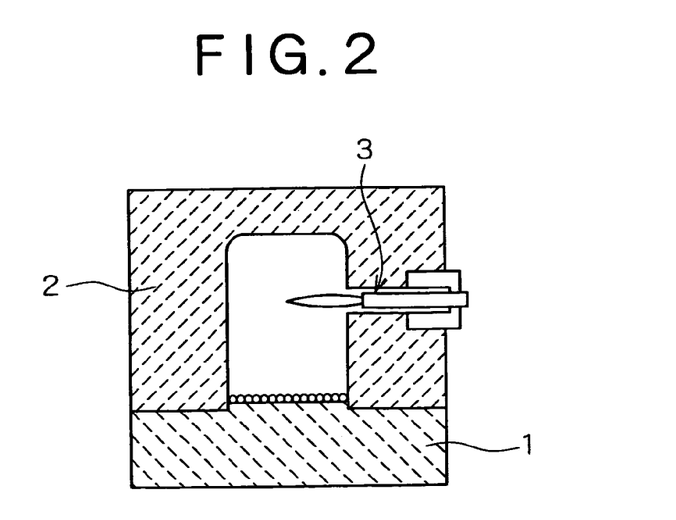
FIG. 2 is a sectional view taken along the line A-A in FIG. 1.
Figure 3:
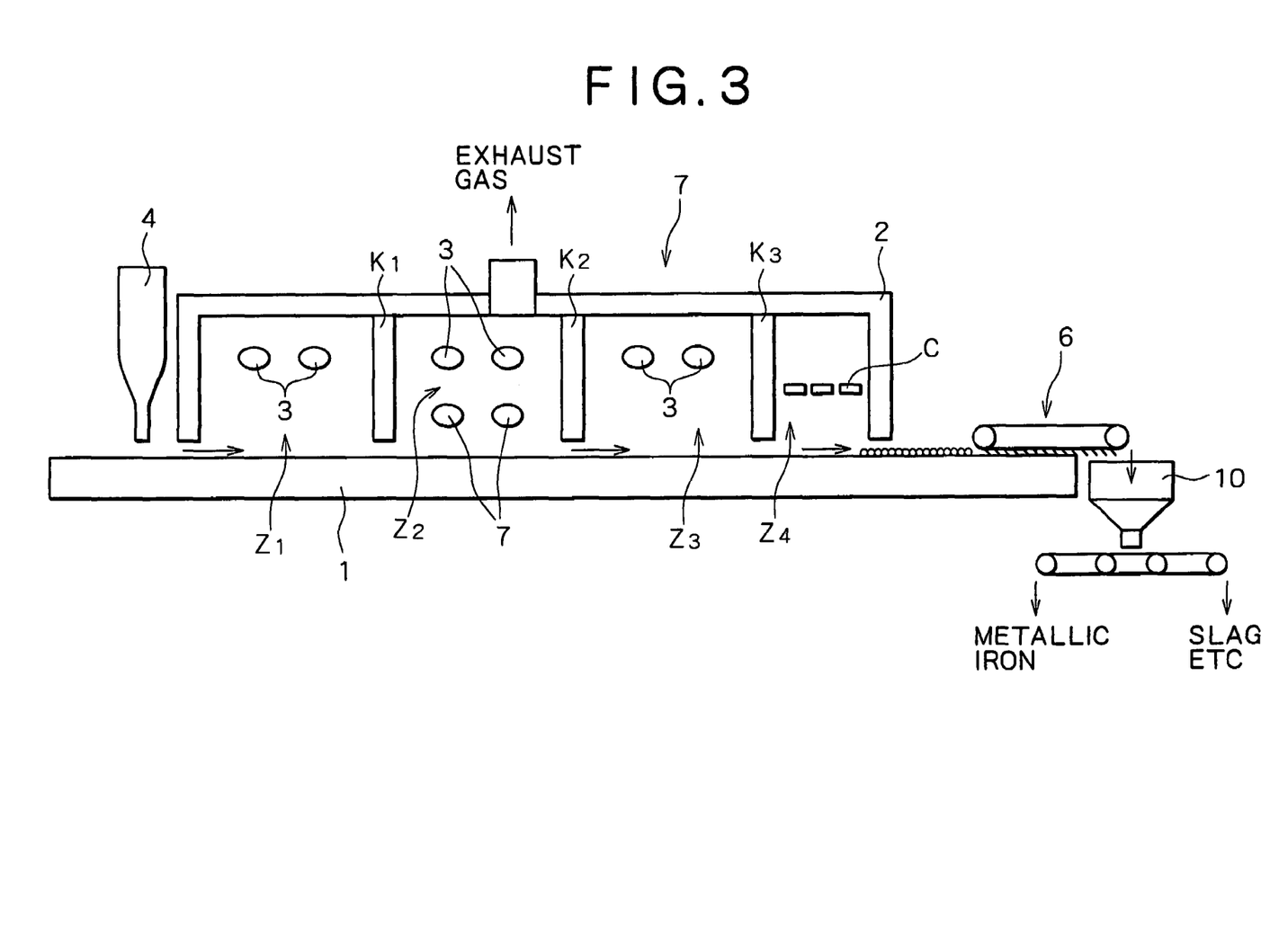
FIG. 3 is an explanatory view showing a section of the apparatus shown in FIG. 1 in the developed form as viewed in the lengthwise direction of the apparatus.

FIGS. 1 to 3 are schematic explanatory views showing one example of a reduction melting furnace of the moving hearth type developed by the inventors, to which the present invention is applied. The furnace is of a dome-shaped structure having a rotary moving hearth in the doughnut form. Specifically, FIG. 1 is a schematic perspective view, FIG. 2 is a sectional view taken along the line A-A in FIG. 1, and FIG. 3 is a schematic explanatory view showing a section of the reduction melting furnace in the developed form as viewed in the rotating direction of the rotary hearth in FIG. 1 for easier understanding. In the drawings, numeral 1 denotes a rotary hearth, and 2 denotes a furnace body covering the rotary hearth. The rotary hearth 1 is constructed such that it can be driven by a driving device (not shown) to rotate at a proper speed.

A plurality of combustion burners 3 are disposed at appropriate places in a wall surface of the furnace body 2. Combustion heat and radiation heat generated by the combustion burners 3 are transmitted to the raw-material compacts on the rotary hearth 1 for performing heating reduction of the raw-material compacts.

In a preferred example shown in FIG. 3, the interior of the furnace body 2 is divided by three partition walls $K_1$, $K_2$, $K_3$ (into a solid-state reducing zone ($Z_1$), a reduction aging zone ($Z_2$), a carburization melting zone ($Z_3$), and a cooling zone ($Z_4$) in this order from the upstream side in the hearth moving direction). In that construction, those zones are preferably partitioned in such a manner that an atmosphere temperature and/or an atmosphere gas composition can be controlled in each of the zones individually. A charging means 4 for charging primary raw materials and/or secondary raw materials, such as an atmosphere modifier, is disposed in an opposed relation to the rotary hearth 1 at the most upstream side in the rotating direction of the furnace body 2, and a discharging means 6 is provided at the most downstream side in the rotating direction (in other words, at the side immediately upstream of the charging means 4 because of the rotary structure). Note that the present invention is not limited to the divided structure described above, and the furnace structure can be of course changed appropriately depending on the size, target production capacity and operation mode of the furnace.

In operation of such a reduction melting furnace, the rotary hearth 1 is rotated at a predetermined speed, and the raw-material compacts are supplied from the charging means 4 onto the rotary hearth 1 such that a layer of the raw-material compacts has a proper thickness. The raw-material compacts charged on the rotary hearth 1 are subjected to combustion heat and radiation heat generated by the combustion burners 3 while moving in the solid-state reducing zone. Iron oxides in the compacts are reduced under heating, while maintaining a solid state, with the aid of the carbonaceous reducing agent in the compacts and carbon monoxide generated upon combustion thereof. Then, reduced iron produced with almost complete reduction of the iron oxides in the reduction aging zone, described later, is further heated under a reducing atmosphere in the carburization melting zone, whereby it is carburized and melted. The molten iron aggregates into granular metallic iron while separating from slag produced simultaneously. Thereafter, the granular metallic iron is cooled by any suitable cooling means C in the cooling zone for solidification, and is successively scraped out by the discharging means 6 provided downstream of the cooling zone. Simultaneously, the slag produced with the granular metallic iron is also discharged. After passing a hopper H, the metallic iron and the slag are separated from each other with any suitable separating means (such as a sieve-or a magnetic separation device). Finally, metallic iron having iron purity of not less than about 95%, more preferably of not less than about 98%, and containing a very small amount of slag components can be obtained.

While the cooling zone is open to the atmosphere in the structure shown in FIG. 2, it is desired from the practical point of view that the cooling zone be covered to have a substantially enclosed structure for preventing heat radiation as far as possible and enabling the atmosphere in the furnace to be appropriately adjusted.

The reduction aging zone is a zone that is especially provided in the present invention to overcome the above-mentioned problems, such as re-oxidization of reduced iron and generation of molten FeO attributable to a variation in progress of reduction of iron oxides in the latter half to last period of a conventional reduction process. In other words, the provision of the reduction aging zone is effective in minimizing re-oxidization of reduced iron that has been sufficiently reduced in the solid-state reducing zone, and in promoting reduction of iron oxides that has not been sufficiently reduced. Thus, a variation in reduction degree among the raw-material compacts can be eliminated, and reduced iron having a high reduction ratio (not lower than 80%) can be obtained in the stage of the reduction aging zone. By carburizing and melting the reduced iron having such a high reduction ratio, metallic iron having a high metallization ratio and high iron purity can be efficiently produced at a high yield. Also, because the above effect can be more easily achieved by adjusting the atmosphere temperature and the atmosphere gas composition in the reduction aging zone, it is preferable to properly adjust them. The method of the present invention will be described below in more detail.

When heating the raw-material compacts including the carbonaceous reducing agent and the iron-oxide containing material in the reduction melting furnace of the moving hearth type as described above, if the atmosphere temperature is too high in the solid-state reducing zone where iron oxides in the raw materials are reduced, more practically, if the atmosphere temperature elevates in excess of the melting point of slag components, such as a gangue component and not-yet-reduced iron oxides in the raw materials, during a certain period of the reduction process, the slag having a low melting point would be melted and would react with a refractory constituting the moving hearth, thereby eroding the refractory. As a result, a flat and uniform hearth could not be maintained any more.

A phenomenon of generation of molten FeO occurred in the solid-state reducing zone depends on compositions of slag-forming components contained in the carbonaceous reducing agent, the iron-oxide containing material, a binder, etc. that constitute the raw-material compacts. If the atmosphere temperature in the reduction process exceeds 1400° C., the slag having a lower melting point would exude and damage the hearth refractory in some cases. If it exceeds 1500° C., the undesired melting reduction reaction would progresses regardless of the brand of iron ore, etc. used as the raw materials, thus resulting in more noticeable erosion of the hearth refractory. Accordingly, the in-furnace temperature during the reduction process, i.e., the temperature in the solid-state reducing zone, which is suitable to ensure the reduction ratio at a high level without exuding the lower-melting-point slag, is in the range of 1200 to 1500° C. and more preferably in the range of 1200 to 1400° C. If the in-furnace temperature is lower than 1200° C., the progress of the solid-state reduction reaction would be slow and the in-furnace retention time has to be prolonged, thus resulting in poor productivity. On the other hand, if the in-furnace temperature exceeds 1400° C., particularly 1500° C., exudation of the lower-melting-point slag would occur in the production process regardless of the brand of iron ore, etc. used as the raw materials, as described above. Hence, erosion of the hearth refractory would be noticeable and the operation would be difficult to continue in some cases. A phenomenon of exudation may not occur even in the temperature range of 1400 or above to. 1500° C. depending on the composition and amount of iron ore mixed in the raw materials. However, the frequency and possibility that such a phenomenon does not occur are relatively low. For those reasons, the temperature in the solid-state reducing zone is preferably in the range of 1200 to 1500° C. and more preferably in the range of 1200 to 1400° C.

Further, since a large amount of CO gas and a small amount of $CO_2$ gas are generated in the solid-state reducing zone with the reaction between the iron-oxide source and the carbonaceous material in the raw-material compacts charged into the furnace, a satisfactory reducing atmosphere is held in an area in the vicinity of the raw-material compacts because of the shielding effect developed by the CO gas generated from the raw-material compacts themselves. In the solid-state reducing zone, therefore, adjustment of atmosphere gas conditions is not particularly required for the reason that a highly reducing atmosphere is maintained by CO gas generated in large amount upon combustion of the carbonaceous material in the raw-material compacts. However, if the reduction process is performed for a long time in the solid-state reducing zone, the problems, e.g., re-oxidation of reduced iron, arise as described above. Accordingly, it is desired that the reduced iron be transferred to the reduction aging zone at the time when the reduction ratio of the iron oxides in the raw-material compacts reaches a certain high value (preferably not lower than 80%).

If the raw-material compacts in which the solid-state reduction ratio of the iron oxides is lower than 80% are heated and melted in the carburization melting zone, the lower-melting-point slag would exude from the raw-material compacts and damage the hearth refractory in some cases, as described above. On the other hand, by heating and melting the raw-material compacts in the carburization melting zone after obtaining the reduction ratio of not lower than 80%, more preferably not lower than 95%, reduction of FeO remaining in a part of the raw-material compacts progresses inside the compacts regardless of the brand and amount of iron ore, etc. mixed in the raw-material compacts. As a result, exudation of the slag can be minimized and stable continuous operation can be realized without causing erosion of the hearth refractory.

As described above, however, the inventors have conducted experiments and gained the finding as follows. The reduction ratios of the raw-material compacts having been reduced in the solid-state reducing zone vary among the raw-material compacts. In particular, reduced iron having progressed more sufficiently in reduction tends to be more easily re-oxidized and to have a lower reduction ratio. Therefore, that reduced iron is not sufficiently carburized and is harder to melt in the carburization melting process, and then discharged while it remains in a not-yet molten state. Thus, a satisfactory level of quality cannot be ensured.

To prevent the reduced iron from being discharged in a not-yet molten state, temperature has to be elevated in the latter half to last period of the reduction process, and the amount of fuel has to be increased to maintain an elevated temperature state. Further, the elevation of temperature causes the hearth refractory to more badly damaged by molten FeO, and hence increases the cost of maintenance such as repair. Accordingly, the provision of the zone (reduction aging zone) for adjusting the reduction ratio of the raw-material compacts is required to prolong the life of the hearth refractory while suppressing erosion of the hearth refractory by the molten FeO, and to progress the solid-state reduction efficiently and to eliminate a variation in reduction degree while minimizing re-oxidization of reduced iron.

Also, in the present invention, it is desired to properly control the atmosphere temperature and/or the atmosphere gas composition in the reduction aging zone. Proper control of the atmosphere temperature and/or the atmosphere gas composition in the reduction aging zone is effective in promoting reduction of not-yet-reduced FeO while preventing melting of the same, and in preventing re-oxidization of reduced iron. In particular, such control is recommended to efficiently progress the reduction to such an extent that the reduction ratio (oxygen removal ratio) is not lower than 80% and preferably not lower than 95%, while maintaining, in a solid state, the raw-material compacts charged into the furnace, without causing partial melting of slag components contained in the raw-material compacts.

The atmosphere temperature in the reduction aging zone is not limited to a particular value, but the following can also be said as with the atmosphere temperature in the solid-state reducing zone. If the atmosphere temperature is lower than 1200° C., the progress of the solid-state reduction reaction would be slow and the in-furnace retention time has to be prolonged, thus resulting in poor productivity. On the other hand, if the atmosphere temperature exceeds 1400° C., particularly 1500° C., exudation of the lower-melting-point slag would occur in the production process regardless of the brand of iron ore, etc. used as the raw materials, as described above. Hence, erosion of the hearth refractory would be noticeable and the operation would be difficult to continue in some cases. Accordingly, the temperature in the reduction aging zone is preferably in the range of 1200 to 1500° C. and more preferably in the range of 1200 to 1400° C. It is then recommended that the atmosphere temperature be set to a temperature as high as possible within the range in which no melting takes place.

As a matter of course, in the actual operation, it is possible to set the in-furnace temperature in the solid-state reducing zone to be not higher than 1200° C., and to progress the solid-state reduction in the reduction aging zone at temperature elevated to the range of 1200 to 1500° C. Thus, the respective temperatures in those zones may be individually adjusted as appropriate and set to specific values depending on the corresponding purposes.

Because the amount of CO gas generated from the raw-material compacts transferred to the reduction aging zone is greatly reduced, reduced iron having progressed more sufficiently in reduction generates CO gas in less amount and the self-shielding action is reduced, as described above. Hence, that reduced iron tends to be more easily affected by combustion exhaust gas (oxidizing gases such as $CO_2$ and $H_2O$) generated upon burner heating, and metallic iron having been reduced once tends to be more easily re-oxidized. By adjusting the atmosphere gas composition in the reduction aging zone so as to provide a reducing atmosphere, therefore, it is possible to more effectively prevent re-oxidization of reduced iron that has been already produced, to progress reduction of iron oxides that have not yet progressed sufficiently in reduction, and to eliminate a variation in reduction degree among the raw-material compacts. As a result, reduced iron having a high reduction ratio (not lower than 80%) can be obtained at a high efficiency.

The method of adjusting the atmosphere gas composition in the reduction aging zone is not limited to a particular one, but it is desired that the atmosphere gas composition in the reduction aging zone be adjusted so as to provide a reducing gas by supplying, for example, an atmosphere modifier. Preferably, the reduction degree $CO/(CO+CO_2)$ of the reducing gas in the vicinity of the raw-material compacts is held to be not less than 0.5.

As the atmosphere modifier, a carbonaceous material and/or a reducing gas is preferably employed. Examples of the carbonaceous material include coals, cokes and so on. When employing coal powder as the atmosphere modifier, the coal powder is preferably pulverized into a grain size of not greater than 3 mm, more preferably not greater than 2 mm, when used. The thus-pulverized coal powder tends to easily unite with oxygen and generate CO under heating, and is advantageous in more surely preventing re-oxidization of reduced iron. Further, in consideration of the yield in supply to the furnace, operability, etc. in the actual operation, the grain size of the coal powder is optimally in the range of 0.3 to 1.5 mm.

The method of supplying the atmosphere modifier is not limited to a particular one, and the atmosphere modifier may be supplied toward the hearth by, for example, providing any desired number of atmosphere modifier supply means (not shown) at any suitable positions in the reduction aging zone. In that case, for keeping the atmosphere gas composition in the vicinity of the raw-material compacts within a range to provide a reducing condition, the atmosphere modifier is preferably supplied to a position as close as to the raw-material compacts. As another method of supplying the atmosphere modifier, the atmosphere modifier may be supplied by utilizing the partition wall that partitions the reduction aging zone. Utilization of the partition wall can be realized, for example, by providing supply means, such as atmosphere modifier supply pipes, in association with the partition wall $K_1$ (on either side facing the solid-state reducing zone or the reduction aging zone, or inside the partition wall), or by assembling those supply pipes in the partition wall. With the method of supplying the atmosphere modifier by utilizing the partition wall, the atmosphere modifier supply pipes can be easily supported and water-cooled, and a change in gas flow caused by the presence of feed pipes is avoided unlike the case of providing the atmosphere modifier supply pipes at any desired position in the reduction aging zone. Accordingly, radiation heat can be prevented from being unevenly transmitted to the raw-material compacts on the hearth. Further, by providing atmosphere modifier supply ports of the supply pipes at a level below the partition wall, the atmosphere modifier can be supplied to the vicinity of the raw-material compacts, and can be avoided from being raised up with the gas flow in the furnace.

Alternatively, the atmosphere modifier may be laid on the hearth prior to charging of the raw-material compacts, and the thickness of a layer of the atmosphere modifier thus laid is not limited a particular value. When laying coal powder, for example, as the atmosphere modifier, the thickness of a layer of the laid coal powder is not limited a particular value, but the absolute amount of the atmosphere modifier would be insufficient if the layer thickness is too thin. The layer thickness is preferably not less than about 2 mm and more preferably not less than about 3 mm. Although there is no particular upper limit in the layer thickness, the atmosphere modifying action is saturated and the atmosphere modifier is economically wasted when the atmosphere modifier is laid in a larger thickness than necessary. From the practical point of view, therefore, the layer thickness of the atmosphere modifier is preferably held not more than about 7 mm and more preferably not more than about 6 mm. The atmosphere modifier may be any other suitable material, such as coke or charcoal, other than coal so long as it serves as a CO generating source. As a matter of course, a mixture of those suitable materials is also usable.

By laying the atmosphere modifier on the hearth prior to charging of the raw-material compacts, the layer of the atmosphere modifier acts to protect the hearth refractory against exudation of molten slag, which sometimes occurs depending on a variation in operating conditions during the reducing and melting steps.

When employing a reducing gas as the atmosphere modifier, a hydrocarbon-based gas, such as CO, $H_2$ or $CH_4$, is preferably employed. Examples of hydrocarbon-based gas include natural gas (particularly gas containing methane as a main component), a coke furnace gas, and a converter gas. The method of supplying a reducing gas is not limited to a particular one. As shown in FIG. 3, by way of example, any desired number of gas supply nozzles 7 may be provided in the reduction aging zone such that the reducing gas is blown toward the hearth from any desired positions. As another method, the atmosphere gas may be supplied by providing supply means, such as reducing gas supply pipes, in association with the partition wall $K_1$ (on either side facing the solid-state reducing zone or the reduction aging zone, or inside the partition wall), or by assembling those supply pipes in the partition wall. With that method, the supply pipes can be easily supported and water-cooled, and a change in gas flow caused by the presence of feed pipes is avoided. Accordingly, radiation heat can be prevented from being unevenly transmitted to the raw-material compacts on the hearth. Further, providing supply ports of the supply pipes at a level below the partition wall is preferable in that the reducing gas can be supplied to the vicinity of the raw-material compacts.

By providing the reduction aging zone, as described above, a variation in the reduction progress of reduced iron after exiting the reduction aging zone can be suppressed and the reduction ratio can be increased. Therefore, exudation of slag from the raw-material compacts under heating in the subsequent carburization melting zone can be minimized and stable continuous operation can be realized without causing erosion of the hearth refractory. In particular, by properly adjusting the atmosphere and the temperature in the reduction aging zone, reduction of not-yet-reduced FeO can be progressed while preventing melting of the not-yet-reduced FeO, and re-oxidization of reduced iron can be more efficiently prevented.

It is desired, as described above, that the raw-material compacts, for which the target reduction ratio has been achieved in the reduction aging zone, be transferred to the carburization melting zone heated to a predetermined temperature. The temperature in the carburization melting zone is not limited to a particular value, but it is desirably higher than the atmosphere temperature in the reduction aging zone for the purpose of further heating the raw-material compacts to carburize and melt the compacts. Hence, the atmosphere temperature in the carburization melting zone is preferably in the range of 1300 to 1500° C. and more preferably in the range of 1350 to 1500° C. When the atmosphere temperature in the carburization melting zone is set to, e.g., 1425° C., the internal temperature of the raw-material compacts transferred to the carburization melting zone is gradually elevated, but it drops once because of heat consumption as latent heat incidental to melting of reduced iron. Thereafter, the internal temperature of the raw-material compacts is elevated again and reaches the setting temperature of 1425° C. Such a temperature drop point can be regarded as a melting start point. Reduced iron particles are carburized by remaining carbon and CO gas, and their melting points are lowered with the carburization, whereby the reduced iron particles are quickly melted. For expediting the melting of the reduced iron particles, therefore, it is desired that an amount of carbon required to sufficiently progress the carburization remain in the reduced iron particles after the solid-state reduction. The required amount of the remaining carbon depends on the mixing ratio between the iron-oxide containing material and the carbonaceous reducing agent used for preparing the raw-material compacts. In general, however, by selecting an initial amount of the mixed carbonaceous material such that the amount of carbon remaining in the reduced iron (i.e., the amount of surplus carbon) in a state where the final reduction ratio in the reduction aging zone reaches almost 100%, namely in a state where the metallization ratio reaches 100%, is not less than 1.5%, the reduced iron can be quickly carburized so as to have a lower melting point and can be quickly melted in the temperature range of 1300 to 1500° C. The amount of carbon remaining in the reduced iron is less than 1.5%, the melting point of the reduced iron would not be sufficiently lowered because of a deficiency in carbon amount necessary for the carburization, and the temperature for heating and melting the reduced iron has to be elevated to a level not lower than 1500° C. in some cases.

The melting temperature of iron not carburized at all, i.e., pure iron, is 1537° C., and the reduced iron can be melted by heating it to temperature higher than 1537° C. However, it is desired that the operating temperature in the actual furnace be held at temperature as low as possible to reduce a thermal load imposed on the hearth refractory, and in consideration of the melting point of slag produced with granular metallic iron, the operating temperature be preferably held not higher than about 1500° C. More specifically, operating conditions are desirably controlled such that a temperature rise of about 50 to 200° C. is obtained relative to the temperature at the start point of the melting process. In other words, for smoothly and efficiently progressing the solid-state reduction and the carburization melting, the atmosphere temperature in the carburization melting zone is preferably set to be 50 to 200° C., more preferably 50 to 150° C., higher than that in the reduction aging zone.

In the carburization melting zone, melting and aggregation of minute reduced iron progresses upon lowering of melting point caused by carburization of the reduced iron with the presence of carbon remaining in the compacts. In this stage, however, the above-mentioned self-shielding effect is also not sufficiently obtained, and the reduced iron tends to easily re-oxidize by oxidizing gases generated with burner combustion. In the period subsequent to this stage, therefore, it is recommended that the in-furnace atmosphere gas composition be properly controlled so as to provide a reducing atmosphere by any suitable method including the use of the atmosphere modifier described above. Preferably, the reduction degree of the atmosphere gas in the vicinity of the compacts is set to be not less than 0.5.

The atmosphere modifier can be supplied in a similar manner as in the case of supplying it to the reduction aging zone (when utilizing the partition wall to supply the atmosphere modifier, the partition wall $K_2$ can be utilized on either side facing the solid-state reducing zone or the reduction aging zone).

In the present invention, the metallization ratio and the reduction ratio are used as indices representing the reduction state of FeO, and they are defined as follows. The relationship between the metallization ratio and the reduction ratio depends on the brand of iron ore, etc. used as the iron-oxide source, but it is expressed as follows.

Metallization ratio=[produced metallic iron/total iron in the compacts]×100 (%)

Reduction ratio=[oxygen amount removed in reduction process/oxygen amount in iron oxides contained in the raw-material compacts]×100 (%)

For efficiently progressing a series of steps from the solid-state reduction to the carburization melting, the atmosphere temperature and the atmosphere gas are preferably controlled in each stage as described above. Stated otherwise, the temperatures in the solid-state reducing zone and the reduction aging zone are preferably held in the range of 1200 to 1400° C. to prevent generation of molten FeO due to the melting reduction reaction, as described-above, and the temperature in the carburization melting zone is preferably held in the range of 1300 to 1500° C. More preferably, the temperature in the reduction aging zone is controlled to be held 50 to 200° C. lower than that in the carburization melting zone. In order to control the atmosphere temperature and/or the atmosphere gas composition for each of the zones individually, each zone is preferably constructed so as to have high independency. From a practical point of view, it is desired that the spacing between the hearth and the lower end of the partition wall be as small as possible. Increasing independency of each zone, however, increases the speed of gas flowing from one to another zone while passing the small spacing and disturbs the gas flow in the vicinity of the raw-material compacts. This may lead to, for example, a difficulty in introducing the atmosphere modifier to the vicinity of the raw-material compacts, or a difficulty in maintaining a reducing atmosphere in the vicinity of the raw-material compacts. For those reasons, the partition wall between the zones is preferably provided with one or more openings for communication with the adjacent zone so that the gas flow is distributed and the amount of gas passing the spacing between the hearth and the lower end of the partition wall. In practice, the shape, number, size and positions of the openings are not limited to particular ones.

In the reduction melting furnace of the present invention, burner combustion is employed to heat the raw-material compacts. In this connection, using regenerative burners is preferable in points of reducing the amount of gas generated after combustion, the amount of fuel used, and disturbance of the gas flow in the vicinity of the raw materials.

Further, for improving combustion efficiency, it is preferable to adjust a ratio of fuel to combustion air by, for example, preheating air used for combustion of fuel or employing air having a higher oxygen concentration as air used for combustion of fuel. When burning fuel at an air-to-fuel ratio not higher than a theoretical one, for example, a reducing gas is mixed in gas generated after the burning and the reduction degree of the generated gas is increased. On the other hand, when burning fuel at an air-to-fuel ratio not lower than and close to the theoretical one, the amount of gas generated after the burning is reduced and disturbance of the gas flow in the vicinity of the raw materials is also reduced. Hence, it is recommended to select a proper air-to-fuel ratio, taking into account both of the above tendencies.

From the viewpoint of suppressing disturbance of the gas flow in the vicinity of the raw materials caused by gas generated with burner combustion, the burners are preferably installed in an upper portion of the furnace, and/or installed to face upward in an upper portion of the furnace.

After the completion of carburization, melting and aggregation of the reduced iron, the reduction degree of the reducing gas is greatly lowered. At this point in the actual operation process, however, metallic iron having melted and aggregated is almost completely separated from slag produced with metallic iron, and hence hardly affected by the atmosphere gas. By cooling and solidifying such metallic iron, granular metallic iron of high iron grade can be obtained with high efficiency.

Although the time required for carrying out the process of the present invention slightly differs depending on, e.g., compositions of iron ore and a carbonaceous material contained in the raw-material compacts, the solid-state reduction, melting and aggregation of iron oxides can be usually completed in about 10 to 13 minutes.

The metallic iron obtained with the above-described method of the present invention contains substantially no slag components and has very high Fe purity. Accordingly, the thus-obtained metallic iron is suitable as an iron source for use in existing steel-making plants such as an electric arc furnace and a converter.

EXAMPLES

The construction and operating advantages of the present invention will be described below in detail in connection with Example. It is, however, to be noted that the following Example is not purported to limit the present invention, and various modifications made without departing from the purports of the present invention mentioned above and below are all involved in the technical scope of the present invention.

Example 1

Figure 4:
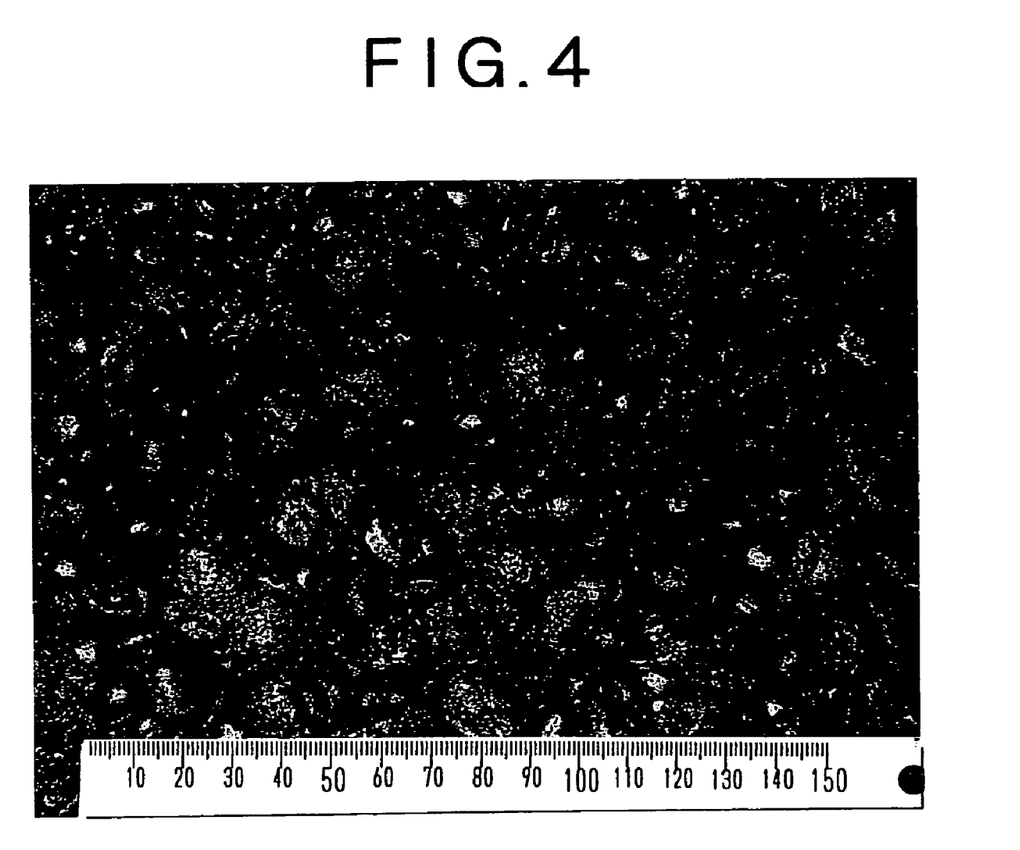
FIG. 4 is a photograph showing one example of metallic iron obtained with Example.

Iron ore (having a composition of Fe: 69.2%, $SiO_2$: 1.8%, and $Al_2O_3$: 0.5%), coal (fixed carbon: 74.3%, volatile matter: 15.9%, and ashes: 9.8%), and a small amount of binder for balling (bentonite) were evenly mixed with each other and then agglomerated into the form of pellets with diameters of about 18 mm. Metallic iron was produced using the pellets as raw-material compacts. More specifically, the pellets were charged into the reduction melting furnace of the moving hearth type, shown in FIGS. 1 to 3, in which solid-state reduction of the pellets was progressed while the atmosphere temperature in the solid-state reducing zone was controlled to 1310° C. The atmosphere temperature in the subsequent reduction aging zone was also controlled to 1310° C. Thereafter, the pellets were transferred to the carburization melting zone, in which the atmosphere temperature was controlled to 1420° C., for carburization, melting, aggregation, and separation of slag produced with metallic iron. The metallic iron having been melted, aggregated and almost completely separated from the slag was transferred to the cooling zone in which it was cooled down to about 1000° C. for solidification. Then, the solidified metallic iron was discharged out of the furnace using a discharging machine. The time required from charging of the raw-material compacts to taking-out of the metallic iron was about 16 minutes. The obtained metallic iron had the C content of 2.6% and the S content of 0.1%. Also, the obtained metallic iron could be easily separated from the slag produced with metallic iron. An external appearance of the finally obtained metallic iron is shown in FIG. 4 (photograph).

Additionally, a reducing gas (gas mixture containing $H_2$ of about 57% and $CH_4$ of about 25% as main components) was introduced to each of the reduction aging zone and the carburization melting zone through supply mechanisms, which were provided respectively in those zones, under adjustment such that the reduction degree $CO/(CO+CO_2)$ of the atmosphere gas composition was held to be not less than 0.5.

Comparative Example 1

Figure 5:
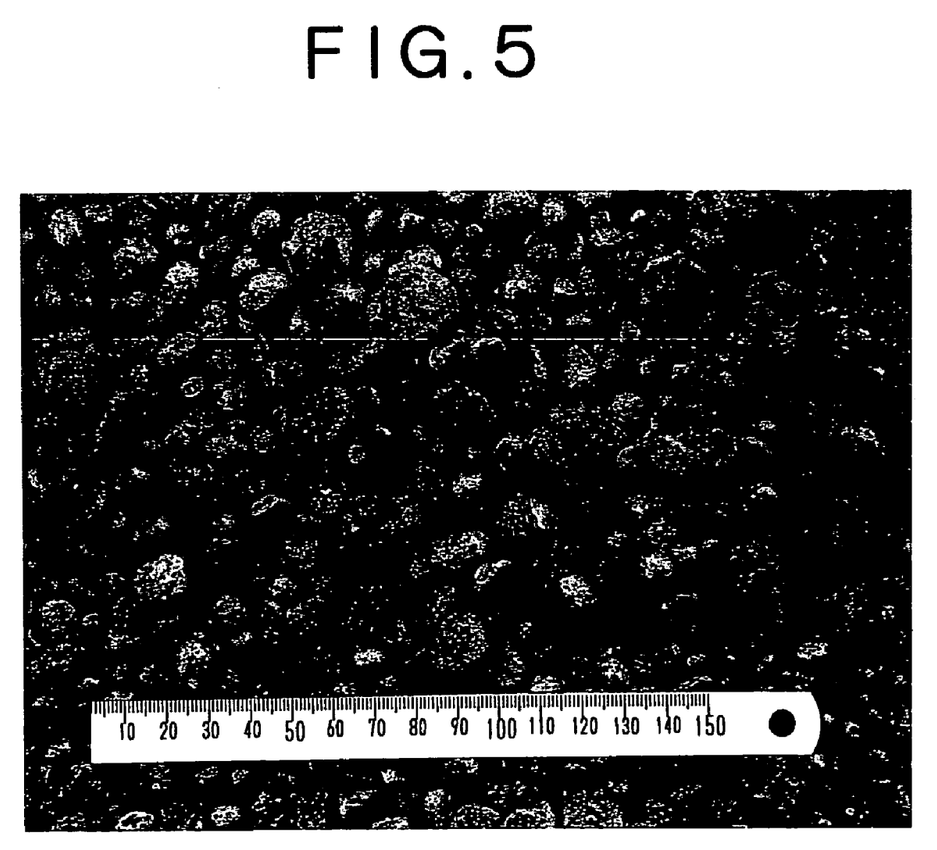
FIG. 5 is a photograph showing one example of metallic iron obtained with Comparative Example.

An experiment was conducted in the same manner as in above Example 1 except that the reducing gas was not introduced to both the solid-state reduction aging zone and the carburization melting zone. As a result, some parts of obtained metallic iron were not yet melted as shown in FIG. 5, and a commercial value of the obtained metallic iron was poor.

INDUSTRIAL APPLICABILITY

According to the present invention constructed as described above, the reduction aging zone for adjusting the reduction ratio of reduced iron produced with reduction of iron oxides in the solid-state reduction zone is provided between the solid-state reduction zone and the carburization melting zone. It is hence possible to progress reduction of the iron oxides, which have not yet sufficiently progressed in reduction, while minimizing re-oxidization of the reduced iron that has been sufficiently reduced in the solid-state reduction zone, and while preventing melting of not-yet-reduced FeO. As a result, a variation in reduction degree among raw-material compacts can be eliminated.

Also, by properly controlling the atmosphere gas composition and/or the atmosphere temperature in the reduction aging zone, re-oxidization of the reduced iron can be minimized to increase metallic iron purity, and erosion of a hearth refractory due to exudation of molten slag and generation of molten FeO can be minimized. As a result, granular metallic iron of high iron purity can be-efficiently produced with continuous operation.

The invention claimed is:

1. A method for producing metallic iron, comprising the steps of:

heating raw materials including a carbonaceous reducing agent and an iron-oxide containing material in a reduction melting furnace of the moving hearth type, wherein said reduction melting furnace is partitioned into at least three zones in a hearth moving direction, at least one of the partitioned zones on the upstream side in the hearth moving direction is a solid-state reducing zone, at least one of the partitioned zones on the downstream side in the hearth moving direction is a carburization melting zone, and a reduction aging zone is provided between the solid-state reducing zone and the carburization melting zone;

supplying an atmosphere modifier which promotes reduction to the reduction aging zone; and reducing and melting iron oxides in the raw materials.

2. The producing method according to claim 1, wherein an atmosphere temperature and/or an atmosphere gas composition in the reduction aging zone are adjusted.

3. The producing method according to claim 1, wherein an atmosphere modifier is supplied to the carburization melting zone.

4. The producing method according to claim 1, wherein the atmosphere modifier is supplied by utilizing a partition wall between the zones wherein the partition wall is configured to be capable of individually controlling an atmosphere temperature or atmosphere gas composition in each of said zones.

5. The producing method according to claim 1, wherein a partition wall between the zones is provided with one or more openings for communication with the adjacent zone.

6. The producing method according to claim 1, wherein an atmosphere temperature in the reduction aging zone is adjusted to the range of 1200-1500° C.

* * * * *